(12) United States Patent   (10) Patent No.: US 11,798,145 B2
Jie                        (45) Date of Patent:     Oct. 24, 2023

(54) IMAGE PROCESSING METHOD AND APPARATUS, DEVICE, AND STORAGE MEDIUM

(71) Applicant: Tencent Technology (Shenzhen) Company Limited, Shenzhen (CN)

(72) Inventor: Zequn Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 17/191,611

(22) Filed: Mar. 3, 2021

(65) Prior Publication Data

US 2021/0192701 A1   Jun. 24, 2021

Related U.S. Application Data

(63) Continuation of application No. PCT/CN2019/119087, filed on Nov. 18, 2019.

(30) Foreign Application Priority Data

Nov. 30, 2018  (CN) .......................... 201811457745.5

(51) Int. Cl.
*G06K 9/00*     (2022.01)
*G06T 5/20*     (2006.01)
(Continued)

(52) U.S. Cl.
CPC .............. *G06T 5/20* (2013.01); *G06N 3/045* (2023.01); *G06N 3/048* (2023.01); *G06N 3/08* (2013.01);
(Continued)

(58) Field of Classification Search
CPC ............ G06T 5/20; G06T 2207/20081; G06T 2207/20084; G06T 11/00; G06N 3/045;
(Continued)

(56) References Cited

U.S. PATENT DOCUMENTS

2017/0061249 A1   3/2017  Estrada et al.
2018/0018539 A1   1/2018  Chen et al.
2019/0188882 A1*  6/2019  Son .................. G06N 3/045

FOREIGN PATENT DOCUMENTS

CN    105872555 A    8/2016
CN    106951867 A    7/2017
(Continued)

OTHER PUBLICATIONS

Tencent Technology, WO, PCT/CN2019/119087, Feb. 18, 2020, 5 pgs.

(Continued)

*Primary Examiner* — Xin Jia
(74) *Attorney, Agent, or Firm* — Morgan, Lewis & Bockius LLP

(57) ABSTRACT

Embodiments of this application disclose an image processing method and apparatus, a device, and a storage medium. The method includes: inputting an original image to a decoder network according to an image transformation instruction, to obtain a first feature map of the original image; inputting the first feature map sequentially to a plurality of transformer networks, each transformer network corresponding to at least one piece of transformation requirement information associated with the original image, to obtain a second feature map, each of the transformer networks being configured to perform image transformation to a respective region of the first feature map; and inputting the second feature map to a reconstruction network, to obtain a target image, the reconstruction network being configured to reconstruct an inputted feature map into a two-dimensional image.

15 Claims, 6 Drawing Sheets

(51) Int. Cl.
    *G06N 3/08*         (2023.01)
    *G06N 3/045*       (2023.01)
    *G06N 3/048*       (2023.01)

(52) U.S. Cl.
    CPC ............... *G06T 2207/20081* (2013.01); *G06T 2207/20084* (2013.01)

(58) Field of Classification Search
    CPC .......... G06N 3/048; G06N 3/08; G06N 3/047; G06N 3/04; G06F 18/213; G06F 18/214; G06F 18/24
    See application file for complete search history.

(56) References Cited

FOREIGN PATENT DOCUMENTS

| CN | 107103590 A | 8/2017 |
|---|---|---|
| CN | 107154023 A | 9/2017 |
| CN | 107437077 A | 12/2017 |
| CN | 107886491 A | 4/2018 |
| CN | 107945282 A | 4/2018 |
| CN | 108122249 A | 6/2018 |
| CN | 108305238 A | 7/2018 |
| CN | 108564127 A | 9/2018 |
| CN | 108596330 A | 9/2018 |
| CN | 108765261 A | 11/2018 |
| CN | 109361934 A | 2/2019 |

OTHER PUBLICATIONS

Tencent Technology, IPRP, PCT/CN2019/119087, May 25, 2021, 6 pgs.
Tencent Technology, ISR, PCT /CN2019/119087, Feb. 18, 2020, 2 pgs.

* cited by examiner

IMAGE PROCESSING METHOD AND APPARATUS, DEVICE, AND STORAGE MEDIUM

CROSS REFERENCE TO RELATED APPLICATIONS

This application is a continuation application of PCT Patent Application No. PCT/CN2019/119087, entitled "IMAGE PROCESSING METHOD AND APPARATUS, DEVICE, AND STORAGE MEDIUM" filed on Nov. 18, 2019, which claims priority to Chinese Patent Application No. 201811457745.5, filed with the State Intellectual Property Office of the People's Republic of China on Nov. 30, 2018, and entitled "IMAGE PROCESSING METHOD AND APPARATUS, STORAGE MEDIUM, AND COMPUTER DEVICE", all of which are incorporated herein by reference in their entirety.

FIELD OF THE TECHNOLOGY

Embodiments of this application relate to the Internet field, and in particular, to an image processing method and apparatus, a device, and a storage medium.

BACKGROUND OF THE DISCLOSURE

With the rapid development and wide application of multimedia technologies and network technologies, a large amount of image information is used in people's daily life and production activities. In many cases, images need to be processed, for example, colors in an image need to be changed.

Currently, image processing may be implemented by using a deep learning model of a generative adversarial network (GAN). In the GAN, if a plurality of features of an inputted image need to be transformed, usually one GAN is trained for each single feature, and then a plurality of trained GANs act on the inputted image sequentially.

However, in the foregoing process, a larger quantity of features indicates a larger required training data and a longer time for training the plurality of GANs. After a plurality of decoding and reconstruction, the process of image processing is complex and time-consuming.

SUMMARY

According to various embodiments provided in this application, an image processing method and apparatus, a device, and a storage medium are provided.

According to one aspect, an image processing method is provided, performed by a computer device, the method including:

inputting an original image to a decoder network according to an image transformation instruction, to obtain a first feature map of the original image, the decoder network being configured to extract features of an image;

inputting the first feature map sequentially to a plurality of transformer networks, each transformer network corresponding to at least one piece of transformation requirement information associated with the original image, to obtain a second feature map, each of the transformer networks being configured to perform image transformation to a respective region of the first feature map; and inputting the second feature map to a reconstruction network, to obtain a target image, the reconstruction network being configured to reconstruct an inputted feature map into a two-dimensional image.

According to one aspect, an image processing method is provided, performed by a computer device, the method including:

constructing an initialized adversarial network, the adversarial network including an image processing network and a plurality of discriminative networks, and the image processing network including a decoder network, a plurality of transformer networks, and a reconstruction network;

training the plurality of discriminative networks according to a plurality of image sets, and iteratively training the adversarial network according to training results of the plurality of discriminative networks; and inputting an original image to the trained image processing network in a case that an image transformation instruction is received, and outputting a target image after image processing.

According to one aspect, an image processing apparatus is provided, including:

a decoding module, configured to input an original image to a decoder network according to an image transformation instruction, output a first feature map of the original image, the decoder network being configured to extract features of an image;

a transformation module, configured to input the first feature map sequentially to a plurality of transformer networks corresponding to at least one piece of transformation requirement information, and output a second feature map, each of the transformer networks being configured to perform image transformation processing; and a reconstruction module, configured to input the second feature map to a reconstruction network, and output a target image, the reconstruction network being configured to reconstruct an inputted feature map into a two-dimensional image.

According to one aspect, an image processing apparatus is provided, including:

a construction module, configured to construct an initialized adversarial network, the adversarial network including an image processing network and a plurality of discriminative networks, and the image processing network including a decoder network, a plurality of transformer networks, and a reconstruction network;

a training module, configured to train the plurality of discriminative networks according to a plurality of image sets, and iteratively train the adversarial network according to training results of the plurality of discriminative networks; and a processing module, configured to input an original image to the trained image processing network in a case that an image transformation instruction is received, and output a target image after image processing.

According to one aspect, a computer device is provided, including a memory and a processor, the memory storing computer-readable instructions, the computer-readable instructions, when executed by the processor, causing the processor to perform the image processing method according to any one of the foregoing possible implementations.

According to one aspect, one or more non-transitory storage mediums storing computer-readable instructions are provided, the computer-readable instructions, when executed by one or more processors, causing the one or more processors to perform the image processing method according to any one of the foregoing possible implementations.

Details of one or more embodiments of this application are provided in the accompanying drawings and description below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

Figure 1:
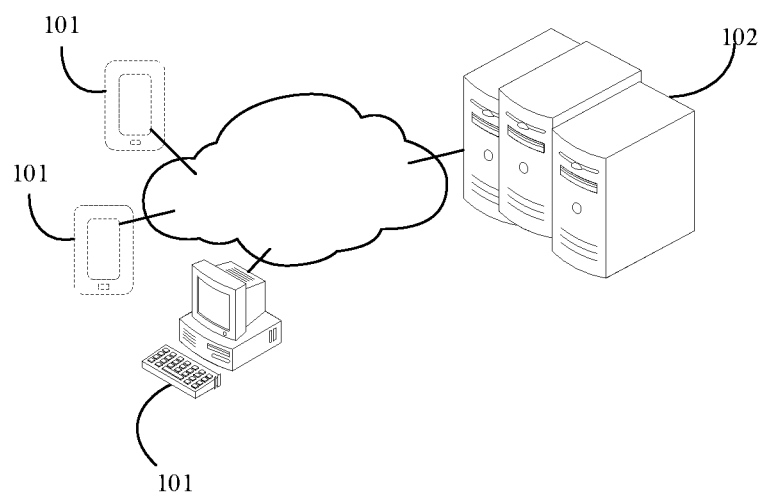
FIG. 1 is a schematic diagram of an implementation environment of an image processing method according to an embodiment of this application.

To make the objectives, technical solutions, and advantages of this application clearer, the following further describes implementations of this application in detail with reference to the accompanying drawings.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Machine learning (ML) is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving its performance. ML is a core of the AI, is a basic way to make the computer intelligent, and is applied to various fields of the AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of this application relate to technologies, for example, CV of AI, which are specifically described by using the following embodiments:

FIG. 1 is a schematic diagram of an implementation environment of an image processing method according to an embodiment of this application. Referring to FIG. 1, in this implementation environment, at least one user equipment 101 and a computer device 102 may be included. An application client may be installed on the at least one user equipment 101, and the application client may be any client capable of performing image processing. When detecting a trigger operation of an image transformation instruction, the user equipment 101 transmits the image transformation instruction carrying an original image to the computer device 102, causing the computer device 102 to perform image processing of a plurality of feature transformation on the original image according to the image transformation instruction.

The computer device 102 may be a server capable of providing an image processing service, and the server may train a processing capability of a GAN by using a plurality of image sets, so as to implement the image processing by using the trained GAN. The computer device 102 may maintain a training database, and store, each time the image transformation instruction is received, the original image carried by the image transformation instruction to an image set in the training database, to maintain and store training data. The computer device 102 may be a terminal.

In some embodiments, the GAN includes a decoder network, a transformer network, a reconstruction network, and a discriminative network. Therefore, an outputted image on which a specific feature transformation is performed can be obtained by the GAN according to an inputted image by adjusting parameters of the network. When a GAN model is used for image processing to transform a plurality of features of an inputted image, one GAN may be trained for each single feature, and then a plurality of trained GANs act on the inputted image sequentially. That is, first, the inputted image is decoded based on the decoder network, then the inputted image is transformed based on the transformer network, and finally, the inputted image is reconstructed based on the reconstruction network. Subsequently, the image enters a next GAN to repeat the foregoing procedures, until an outputted image is obtained after the plurality of features of the inputted image is transformed. However, in the foregoing method, when there are more features, more training data is required, and longer time is consumed by training the plurality of GANs. After a plurality of decoding and reconstruction, the process of image processing is complex and time-consuming. Therefore, the original image may be inputted to the decoder network for feature extraction, then be inputted sequentially to a plurality of transformer networks to transform a plurality of features, and then be inputted to the reconstruction network to be reconstructed into a target image. Therefore, when there are more features, the entire process only requires one time of decoding and reconstruction, and making the process of image processing simple and smooth.

Figure 2:
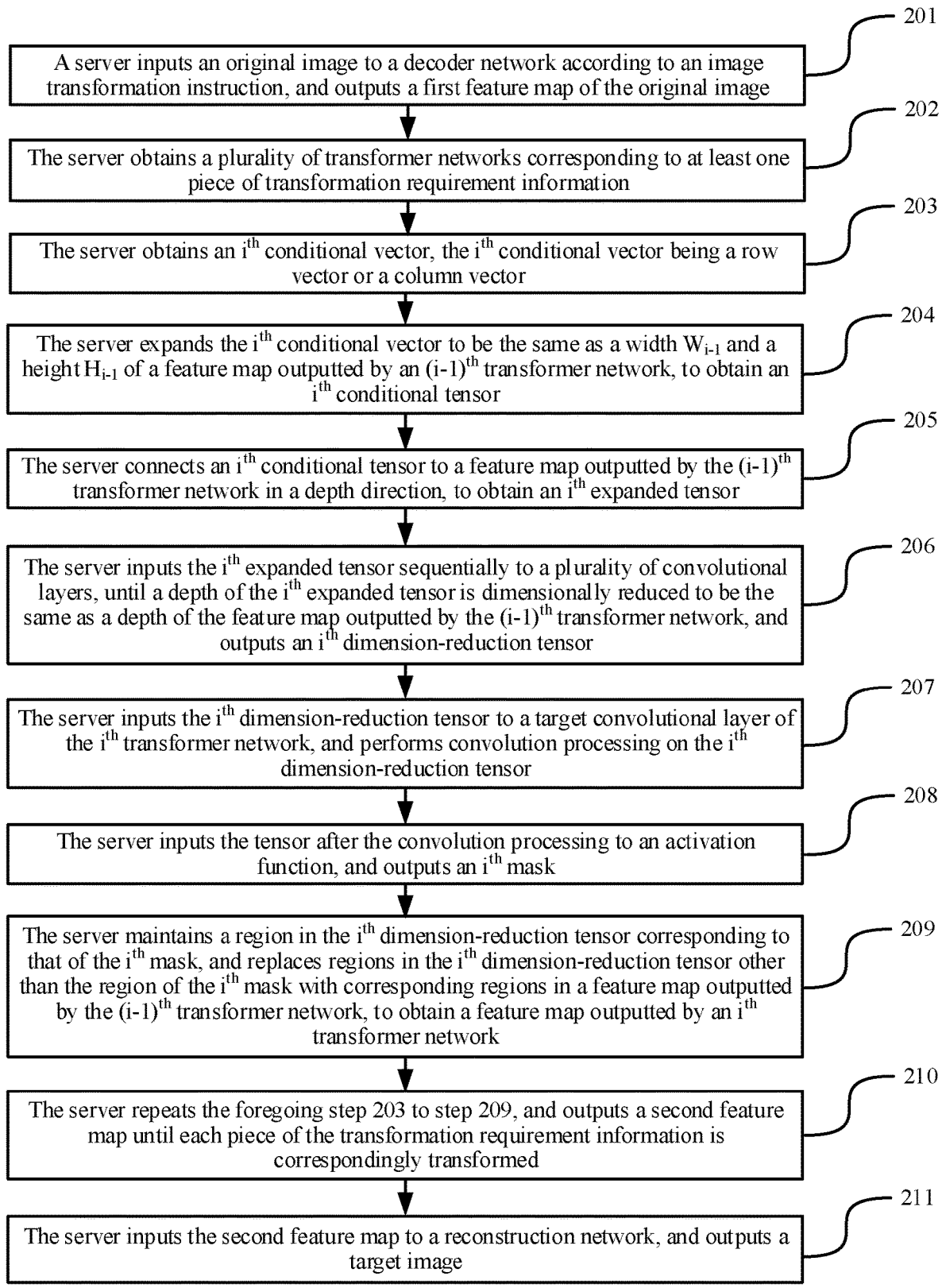
FIG. 2 is a flowchart of an image processing method according to an embodiment of this application.

FIG. 2 is a flowchart of an image processing method according to an embodiment of this application. Referring to FIG. 2, an example in which the computer device 102 is the server providing the image processing service is used for description. This embodiment includes the following steps.

201. A server inputs an original image to a decoder network according to an image transformation instruction, outputs a first feature map of the original image, the decoder network being configured to extract features of an image.

In a possible implementation, the original image is a to-be-processed image. The image transformation instruction is used for indicating the server to perform image transformation on the carried original image, for example, to transform facial feature forms and hair colors of the original image. The image transformation instruction may be an image transformation instruction transmitted by a user equipment through an application client, or may be an image transformation instruction triggered by the server by default during training. An obtaining manner of the image transformation instruction is not specifically limited in the embodiments of this application.

In some embodiments, the image transformation instruction may carry a to-be-processed image, and the server uses the to-be-processed image as the original image. The original image may have a plurality of transformable features, for example, the feature may be hair, facial features of a human face and accessories.

In some embodiments, the server may also obtain the original image from a locally stored database randomly or according to a preset rule. An obtaining manner of the original image is not specifically limited in the embodiments of this application; optionally, the preset rule may be to obtain an original image with a high pixel first, or to obtain a portrait first, or the like. The preset rule is not specifically limited in the embodiments of this application.

The decoder network may extract features of an image by using a first target quantity of convolutional layers, and the first target quantity may be preset, or may be adjusted in a process of training the decoder network. A source of the first target quantity is not specifically limited in the embodiments of this application.

Using a first convolutional layer that the original image enters as an example, it is assumed that in the original image, a height is $H_0$, a width is $W_0$, and a depth is $D_0$, $H_0$, $W_0$, and $D_0$ being positive integers. The depth Do may be a quantity of channels of the original image, for example, when an RGB channel is selected, $D_0=3$, respectively being a red channel, a green channel, and a blue channel. At least the following hyper-parameters are preset when the first convolutional layer is initialized: a size F of a filter, and a quantity K of the filters. Each filter is used for indicating a weight of weighting features of the original image, and each filter may be a weight matrix with a size of $F*F*D_0$. A depth of the filter matching a depth of the original image, F being a positive integer of a minimum value between $H_0$ and $W_0$. The quantity K of the filters is a positive integer, and K is used for indicating a feature quantity that can be extracted by the first convolutional layer, and that is, a quantity of feature maps outputted by the first convolutional layer is also K. During GAN training, parameters of each filter are adjusted according to a deviation indicated by a loss function of each of the networks, and a final matrix value of each filter can be obtained after the training. In some embodiments, the original image may also be single-channel. A quantity of channels of the original image is not limited in the embodiments of this application.

Optionally, to increase a processing speed of a convolution operation, during initialization, a stride S may also be specified, so that during the convolution operation, the stride S may be any positive integer greater than or equal to 1 and less than or equal to a minimum value between $H_0$ and $W_0$. Optionally, to extract edge information of the original image more accurately, during initialization, boundary filling P may also be specified. The boundary filling P is an integer greater than or equal to 0, and P is used for indicating a quantity of zero padding layers in a periphery of the original image. When the stride S and the boundary filling P are not specified, S is equal to 1 and P is equal to 0 by default.

Based on the foregoing parameters, the first convolutional layer performs a convolution weighting operation on each of the channels of the original image by using S as a stride according to the K filters, so as to obtain K first-layer feature maps. The K first-layer feature maps are used as an input of a second convolutional layer, that is, a depth of an inputted image of the second convolutional layer is K, and then a depth of each of the filters in the second convolutional layer is also K. By analogy, an outputted image of each convolutional layer is used as an inputted image of a next convolutional layer. A first feature map with a height of H, a width of W, and a depth of D is obtained after feature extraction is performed by using the first target quantity of convolutional layers, H, W, and D being positive integers. The depth D of the first feature map may be used for indicating a quantity of feature information extracted by the decoder network.

In a possible implementation, when hyper-parameters are preset, the stride S is set to 1, and the boundary filling P is set to $(F-1)/2$, so that a height and a width of a feature map outputted by the first convolutional layer are the same as those of the original image. Therefore, each of the convolutional layers in the decoder network is set to be that: the stride S is equal to 1, and the boundary filling P is equal to (F−1)/2, so that in the first feature map outputted by the decoder network, the height H is equal to $H_0$ and W is equal to $W_0$.

202. The server obtains a plurality of transformer networks corresponding to at least one piece of transformation requirement information.

The server may obtain, according to at least one piece of transformation requirement information, a plurality of transformer networks corresponding to at least one piece of transformation requirement information from the existing plurality of transformer networks. The at least one piece of transformation requirement information may be information carried by the image transformation instruction, or may be information set by the server by default, or may further be at least one piece of transformation requirement information corresponding to a certain transformation requirement. An obtaining manner of the at least one piece of transformation requirement information is not specifically limited in the embodiments of this application.

In the process of obtaining the plurality of transformer networks, the server may obtain, based on the at least one piece of transformation requirement information, a plurality of transformer networks corresponding to the at least one piece of transformation requirement information from the existing plurality of transformer networks at one time. Optionally, the server may alternatively obtain a transformer network corresponding to the transformation requirement information each time one piece of transformation requirement information is processed. A manner for obtaining the plurality of transformer networks is not specifically limited in the embodiments of this application.

In some embodiments, after the server obtains the plurality of transformer networks corresponding to the at least one piece of transformation requirement information at one time, the server may further sort the plurality of transformer networks corresponding to the at least one piece of transformation requirement information. Optionally, the server may sort the plurality of transformer networks corresponding to the at least one piece of transformation requirement information according to a detail degree of the transformation requirement information, for example, features with a low processing detail requirement are processed first. A sorting rule of the plurality of transformer networks corresponding to the at least one piece of transformation requirement information is not specifically limited in the embodiments of this application. The foregoing sorting may refer to using an output of a transformer network as an input of a next transformer network.

Each piece of transformation requirement information is used for indicating a requirement of transforming based on a feature class. Each piece of transformation requirement information may correspond to one or more transformer networks, and each trained transformer network may be used for performing feature transformation according to corresponding transformation requirement information. For example, the transformation requirement information $C_i$ is to change a hair color into green, and the feature class is a hair color, and the transformer network $T_i$ is used for transforming a hair color in an inputted feature map into green.

Figure 3:
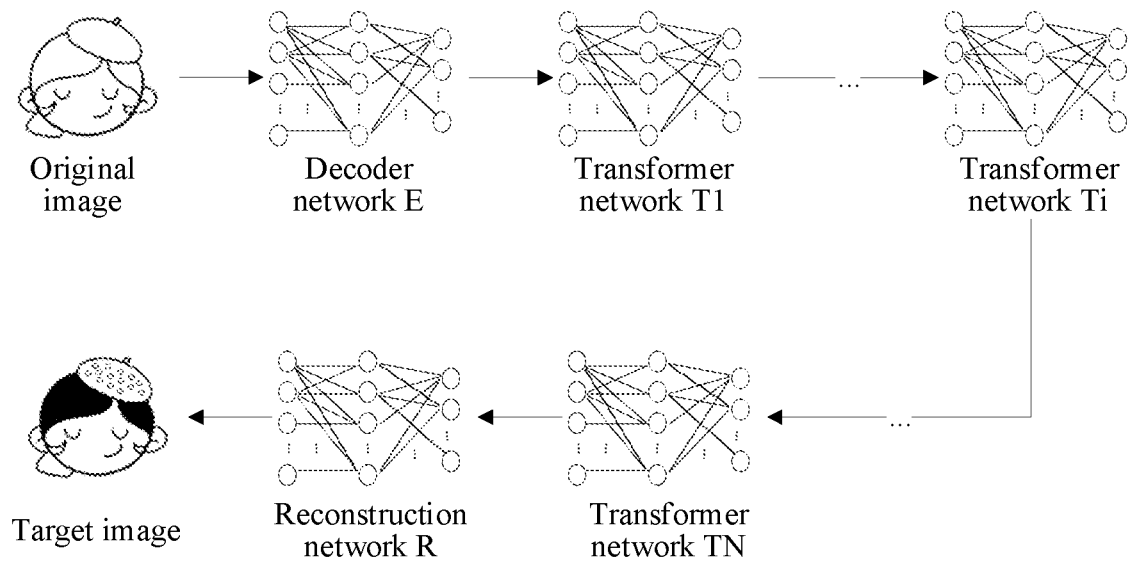
FIG. 3 is a schematic diagram of an image processing method according to an embodiment of this application.

FIG. 3 is a schematic diagram of an image processing method according to an embodiment of this application. An example in which a quantity of obtained transformer network is N is used as an example. Referring to FIG. 3, after an original image is processed by N transformer networks, a target image after N feature transformation is obtained. In the following step 203 to step 209, using an obtained $i^{th}$ transformer network i being a positive integer less than or equal to N as an example to describe how the $i^{th}$ transformer network performs $i^{th}$ feature transformation. In an image processing process, each transformer network has a similar feature transformation process, and details are not described herein again. A second feature map is outputted after corresponding feature transformation is implemented for all the transformation requirement information. Then the following step 211 is performed.

203. The server obtains an $i^{th}$ conditional vector, the $i^{th}$ conditional vector being a row vector or a column vector.

Figure 4:
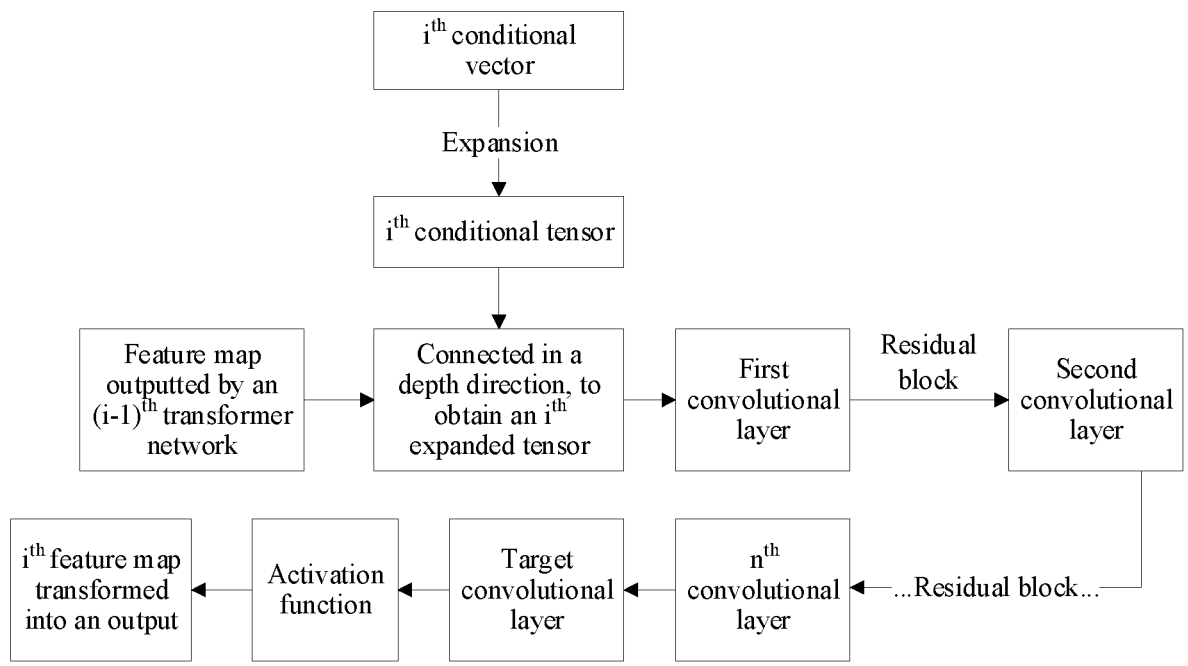
FIG. 4 is a schematic structural diagram of a transformer network according to an embodiment of this application.

FIG. 4 is a schematic structural diagram of a transformer network according to an embodiment of this application. Referring to FIG. 4, the $i^{th}$ transformer network may include n convolutional layers and a target convolutional layer, n being a positive integer. The $i^{th}$ conditional vector is used for indicating target transformation requirement information of an $i^{th}$ feature class. The $i^{th}$ conditional vector may be a parameter inputted from the outside, or may be generated according to the target transformation requirement information, and the $i^{th}$ conditional vector is a non-zero vector. A manner of obtaining the $i^{th}$ conditional vector is not limited in the embodiments of this application.

Based on the foregoing examples, the conditional vector may be used for representing transformation types of image transformation requirements. When the target transformation requirement information is to change a hair color into green, a length of the conditional vector may be used for indicating a quantity of colors of hair color transformation that can be implemented by the GAN. For example, the GAN can implement the hair color transformation of 5 colors, so that the length di of the conditional vector is equal to 5. Each digit of the conditional vector may be used for indicating one color, and if a third digit indicates green, the third digit of the conditional vector is set to 1, and all of the other values are set to 0, that is, the conditional vector is [0, 0, 1, 0, 0]. The length of the conditional vector is not specifically limited in the embodiments of this application.

204. The server expands the $i^{th}$ conditional vector to be the same as a width $W_{i-1}$ and a height $H_{i-1}$ of a feature map outputted by an $(i-1)^{th}$ transformer network, to obtain an $i^{th}$ conditional tensor.

In a possible implementation, first, the $i^{th}$ conditional vector is copied for $W_{i-1}$ rows in a width direction, thereby obtaining a two-dimensional matrix with of a size of $d_i * W_{i-1}$ through expansion. Further, the two-dimensional matrix is copied for $H_{i-1}$ columns in a height direction, thereby obtaining a three-dimensional tensor with a size of $d_i * H_{i-1} * W_{i-1}$ through expansion, that is, the $i^{th}$ conditional tensor. $d_i$, $H_{i-1}$, and $W_{i-1}$ are positive integers.

Optionally, the $i^{th}$ conditional vector may be further copied and expanded in a height direction first, and then an obtained two-dimensional matrix is copied and expanded in a width direction. Alternatively, the $i^{th}$ conditional vector is copied and expanded in both the width direction and the height direction simultaneously. In some embodiments, the conditional vector may be neither a row vector nor a column vector, as long as can represent the target transformation requirement information indicating the $i^{th}$ feature class. For example, the conditional vector may be the conditional tensor, that is, without expansion of the conditional vector, the three-dimensional matrix inputted from the outside may be directly obtained as the conditional tensor. An obtaining manner of the $i^{th}$ conditional tensor is not limited in the embodiments of this application.

205. The server connects an $i^{th}$ conditional tensor to a feature map outputted by the $(i-1)^{th}$ transformer network in a depth direction, to obtain an $i^{th}$ expanded tensor.

A width of the $i^{th}$ conditional tensor is the same as that of the feature map outputted by the $(i-1)^{th}$ transformer network, and a height of the $i^{th}$ conditional tensor is also the same as that of the feature map outputted by the $(i-1)^{th}$ transformer network, so that the conditional tensor and the feature map outputted by the $(i-1)^{th}$ transformer network can be connected directly in the depth direction. It is assumed that a depth of the feature map outputted by the $(i-1)^{th}$ transformer network is $D_{i-1}$, so that a size of the obtained expanded tensor is $(D_{i-1}+d_i)*H_{i-1}*W_{i-1}$, $D_{i-1}$ being a positive integer.

206. The server inputs the $i^{th}$ expanded tensor sequentially to a plurality of convolutional layers, until a depth of the $i^{th}$ expanded tensor is dimensionally reduced to be the same as a depth of the feature map outputted by the $(i-1)^{th}$ transformer network, and outputs an $i^{th}$ dimension-reduction tensor.

In the foregoing steps, by using a plurality of convolutional layers in the $i^{th}$ transformer network, the depth of the $i^{th}$ expanded tensor is reduced from $D_{i-1}+d_i$ to $D_{i-1}$, further to obtain an $i^{th}$ dimension-reduction tensor with a size of $D_{i-1}*H_{i-1}*W_{i-1}$. Internal structures of the plurality of convolutional layers may be similar to a structure of the convolutional layer in the decoder network in the foregoing step 201. That is, each of the convolutional layers includes a filter, hyper-parameters of each of the convolutional layers may be the same or different, and details are not described herein again.

Optionally, a residual block may be further introduced between each of the convolutional layers in the transformer network. For example, if an input of a $j^{th}$ convolutional layer, also an output of a $(j-1)^{th}$ convolutional layer, is $x_j$, then an output of the $j^{th}$ convolutional layer may be represented as $f_j(x_j)$. A $j^{th}$ residual block is introduced between the $j^{th}$ convolutional layer and a $(j+1)^{th}$ convolutional layer, the $j^{th}$ residual block may be represented as $f_j(x_j)+X_j$, and the $j^{th}$ residual block is used as an input of the $(j+1)^{th}$ convolutional layer. A problem of degradation of a neural network is resolved by introducing the residual block, so that the convolutional layers of the $i^{th}$ transformer network are deeper, and a better image processing effect is achieved.

In a possible implementation, a quantity of the plurality of convolutional layers may be a hyper-parameter preset by the server, or may be a value adjusted during training of the GAN. An obtaining manner of the quantity of the plurality of convolutional layers are not specifically limited in the embodiments of this application.

207. The server inputs the $i^{th}$ dimension-reduction tensor to a target convolutional layer of the $i^{th}$ transformer network, and performs convolution processing on the $i^{th}$ dimension-reduction tensor.

In some embodiments, an internal structure of the target convolutional layer is also similar to the structures of the foregoing plurality of convolutional layers. Details are not described herein again. Optionally, when parameters of a plurality of convolutional layers and a target convolutional layer of each transformer network are preset, a stride S is equal to 1 and a boundary filling P is equal to $(F-1)/2$, so that after feature transformation is performed on a first feature map by using a plurality of transformer networks, a height and a width of an outputted second feature map are the same as those of an original image.

208. The server inputs the tensor after the convolution processing to an activation function, and outputs an $i^{th}$ mask, the activation function being used for performing nonlinear processing on the inputted tensor.

The $i^{th}$ mask is used for indicating a transformation region corresponding to the $i^{th}$ transformation requirement information in a feature map outputted by the $(i-1)^{th}$ transformer network. Based on the foregoing examples, the $i^{th}$ mask is used for indicating a region representing hair in the feature map outputted by the $(i-1)^{th}$ transformer network.

Optionally, the $i^{th}$ mask may be a two-dimensional matrix with a size of $H_{i-1}*W_{i-1}$, and then the $i^{th}$ mask may be expanded to have the same depth as that of the $i^{th}$ dimension-reduction tensor, to facilitate subsequent transformation processing. In some embodiments, an expanded mask may further be directly obtained by directly adjusting parameters of the target convolutional layer.

Optionally, the activation function may be Sigmoid, may be tanh, may further be ReLU, or the like that can perform nonlinear processing on an output of the target convolutional layer, thereby improving a detail expression capability of GAN transformation. A function expression of the activation function is not specifically limited in the embodiments of this application.

209. The server maintains a region in the $i^{th}$ dimension-reduction tensor corresponding to that of the $i^{th}$ mask, and replaces regions in the $i^{th}$ dimension-reduction tensor other than the region of the $i^{th}$ mask with corresponding regions in a feature map outputted by the $(i-1)^{th}$ transformer network, to obtain a feature map outputted by an $i^{th}$ transformer network.

In the foregoing step, it is assumed that the feature map outputted by the $(i-1)^{th}$ transformer network is represented as $f_{i-1}$, the $i^{th}$ dimension-reduction tensor is represented as $f_i'$, and the $i^{th}$ mask is represented as $g_i$, the feature map outputted by the $i^{th}$ transformer network may be represented as $f_i = g_i*f_i' + (1-g_i)*f_{i-1}$, that is, feature transformation is only performed on the region corresponding to the $i^{th}$ transformation requirement information in the feature map outputted by the $(i-1)^{th}$ transformer network.

210: The server repeats the foregoing step 203 to step 209, and outputs a second feature map until each piece of the transformation requirement information is correspondingly transformed.

The foregoing step 203 to step 209 show a method for performing $i^{th}$ transformation requirement information of an $i^{th}$ transformer network. After the step 203 to step 209 are completed, image transformation may be continued based on an $(i+1)^{th}$ transformer network. An output of a preceding transformer network is used as an input of a next transformer network through serial connection of each of the transformer networks, until feature transformation is performed on the transformer network corresponding to each piece of transformation requirement information, and an image outputted by the last transformer network is the second feature map.

211. The server inputs the second feature map to a reconstruction network, and outputs a target image, the reconstruction network being configured to reconstruct an inputted feature map into a two-dimensional image.

In a possible implementation, in the reconstruction network, the second feature map may be reconstructed into a target image by using a plurality of convolutional layers, and the target image is an original image processed by the at least one piece of transformation requirement information.

Through the method provided in the embodiments of this application, an original image is inputted to a decoder network for feature extraction through a server according to an image transformation instruction, then is inputted sequentially to a plurality of transformer networks to implement transformation of a plurality of features, and then is inputted to the reconstruction network to be reconstructed into a target image, so that when there are more features, the entire process only requires one time of decoding and reconstruction, and making the process of image processing simple and smooth. Further, by introducing a conditional vector and a mask, each of the transformer networks can implement transformation of corresponding transformation requirement information without participation of a discriminative network, thereby simplifying a network architecture of the GAN. Further, by setting a stride S and a boundary filling P to appropriate values, a height and a width of an outputted second feature map can be the same as those of the original image, thereby avoiding missing detail information.

Any combination of the foregoing optional technical solutions may be used to form an optional embodiment of the present disclosure. Details are not described herein again.

Figure 5:
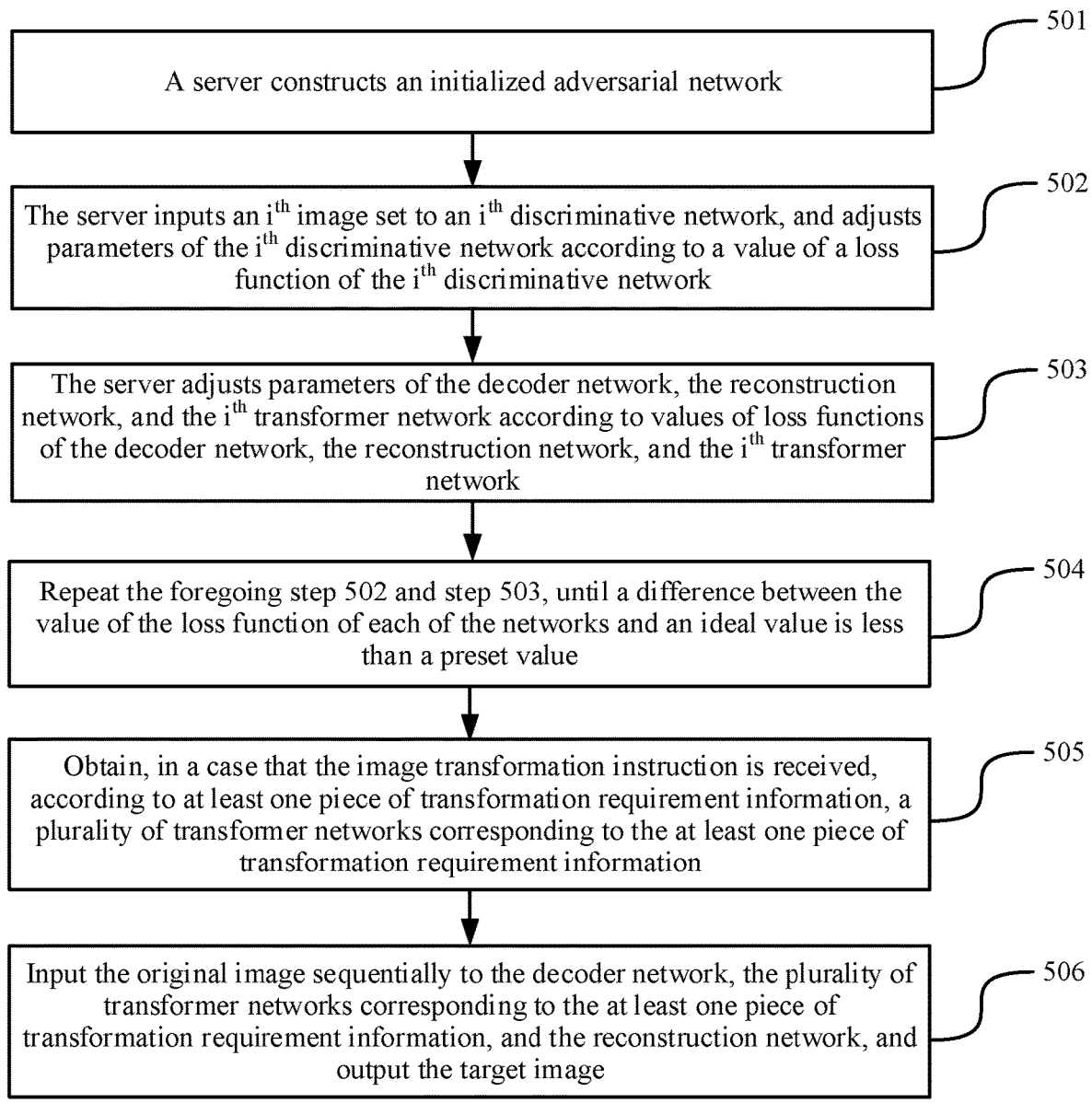
FIG. 5 is a flowchart of an image processing method according to an embodiment of this application.

FIG. 5 is a flowchart of an image processing method according to an embodiment of this application. Referring to FIG. 5, this embodiment includes:

501. The server constructs an initialized adversarial network, the adversarial network including a decoder network, a plurality of transformer networks, a reconstruction network, and a plurality of discriminative networks.

Figure 6:
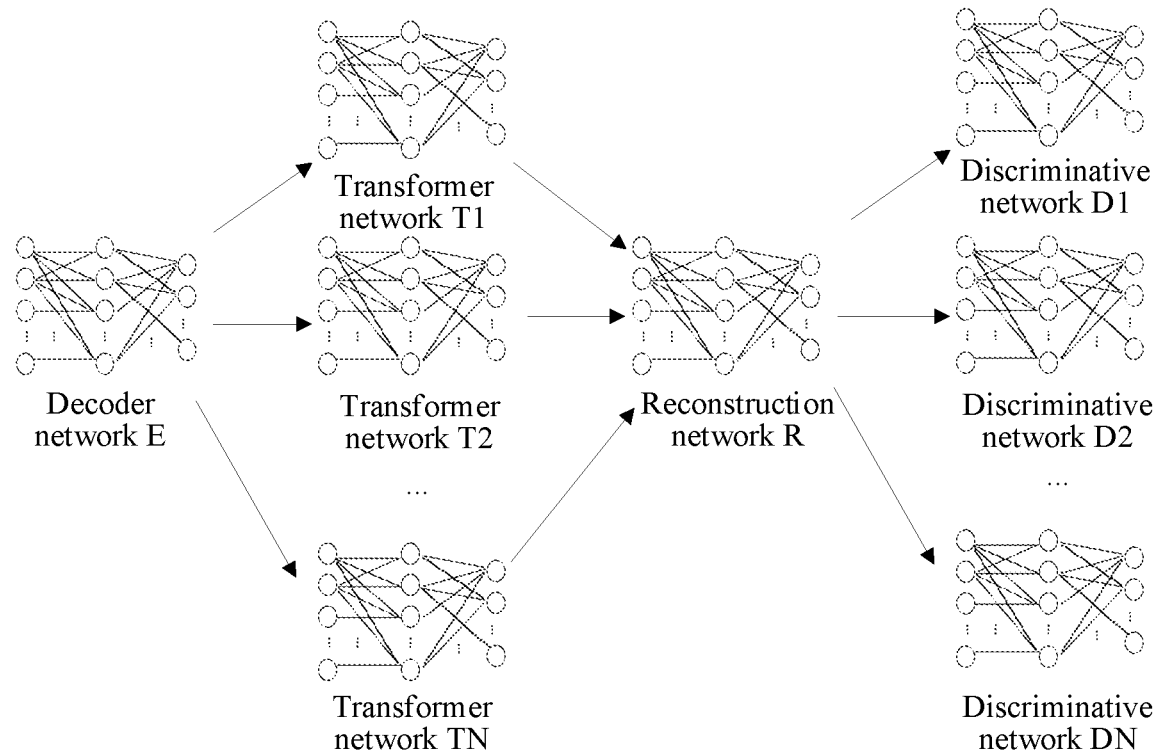
FIG. 6 is a schematic structural diagram of an adversarial network according to an embodiment of this application.

The decoder network, the plurality of transformer networks, and the reconstruction network may be referred to as image processing networks, and the image processing networks are used for processing images. Optionally, FIG. 6 is a schematic structural diagram of an adversarial network according to an embodiment of this application. Referring to FIG. 6, when the initialized adversarial network is constructed, a plurality of transformer networks may be parallelly connected after the decoder network, the reconstruction network is connected after the plurality of transformer networks, and the plurality of discriminative networks are parallelly connected after the reconstruction network. Each of the discriminative networks and the transformer network in the plurality of transformer networks are in a one-to-one correspondence.

In the foregoing process, because the plurality of transformer networks and the plurality of discriminative networks are connected to the same decoder network and reconstruction network during training, training data of the decoder network and the reconstruction network can be shared in the training process, so as to reduce data required for training and optimize resource configurations of the adversarial network.

Optionally, when the initialized adversarial network is constructed, hyper-parameters of each of the networks may further be preset. For different transformer networks, hyper-parameters may be set to the same initialized value or different initialized values, which is the same for different discriminative networks, and details are not described herein again. The initialized values of the hyper-parameters of each of the networks in the initialization process are not specifically limited in the embodiments of this application.

502. The server inputs an $i^{th}$ image set to an $i^{th}$ discriminative network, and adjusts parameters of the $i^{th}$ discriminative network according to a value of a loss function of the $i^{th}$ discriminative network.

Optionally, the $i^{th}$ discriminative network is any discriminative network in a plurality of discriminative networks. In step 502 to step 504, a training case of one branch, that is, the branch composed of the decoder network, the $i^{th}$ transformer network, the reconstruction network, and the $i^{th}$ discriminative network, in the adversarial network is used as an example for description. Any branch in the adversarial network has similar training steps, and each branch in the adversarial network shares the training data of the decoder network and the reconstruction network. Details are not described herein again.

In some embodiments, each image set may correspond to one feature class. Each feature class may correspond to one discriminative network. Each image set may include a true sample set and a false sample set. An image set corresponding to a first feature class is used as an example, the true sample set may be an image transformed by the first feature class, and the false sample set may be an image transformed by a second feature class. The second feature class may be any feature class in a transformable class group other than the first feature class. By training the discriminative network, for the true sample set, the discriminative network may output 1, and for the false sample set, the discriminative network may output 0, so as to implement a discrimination function.

During training of the GAN, the $i^{th}$ discriminative network may be configured to determine outputted results processed by the decoder network, the $i^{th}$ transformer network, and the reconstruction network, so as to adjust parameters of each of the networks in connection, to obtain an optimized GAN. In a process of processing an image after the training, there may be no need to use a plurality of discriminative networks.

Optionally, for the $i^{th}$ discriminative network, the loss function may include three types. A first-type loss function may be a function $L_{adv,i}$ through which the $i^{th}$ discriminative network $D_i$ determines whether an outputted image processed by a decoder network E, an $i^{th}$ transformer network $T_i$, and a reconstruction network R is a true. A form of the function may be represented as:

$$L_{adv,i}(E, T_i, R, D_i) = e^{log(D_i(y))} + e^{log(1-D_i(R(T_i(E(x)))))}$$

y is an image in the true sample set, x is an image generated by a GAN network, and when a picture reconstructed by the GAN network is more vivid, a value of the loss function $L_{adv,i}$ is smaller, that is, a loss is less.

A second-type loss function may be a function $L_{cls,i}^r$ for performing feature classification on images in the true sample set in a discrimination process. A form of the function may be represented as:

$$L_{cls,i}^r = e^{-log(D_{cls,i}(c_i|x))}$$

$c_i$ is a feature class corresponding to the $i^{th}$ discriminative network, so that when feature classification of the discriminative network is more accurate, a value of the loss function $L_{cls,i}^r$ is smaller, that is, a loss is less.

A third-type loss function may be a function $L_{cls,i}^f$ for performing feature classification on images generated by the GAN network in a discrimination process. A form of the function may be represented as:

$$L_{cls,i}^f = e^{-log(D_{cls,i}(c_i|R(T_i(E(x)))))}$$

when feature classification of the discriminative network is more accurate, a value of the loss function $L_{cls,i}^f$ is smaller, that is, a loss is less.

503. The server adjusts parameters of the decoder network, the reconstruction network, and the $i^{th}$ transformer network according to values of loss functions of the decoder network, the reconstruction network, and the $i^{th}$ transformer network.

Optionally, a loss function $L_{cyc}^{ER}$ of the reconstruction network and the decoder network may be represented by using the following form:

$$L_{cyc}^{ER} = e^{|R(E(x))-x|_1}$$

The loss function $L_{cyc}^{ER}$ is used for indicating a loss between an image obtained by directly inputting an original image to the reconstruction network after the decoder network and the original image. When the reconstruction network and the decoder network are more accurate, a value of $L_{cyc}^{ER}$ is smaller.

Optionally, a loss function $L_{cyc}^{T_i}$ of the $i^{th}$ transformer network may be represented by using the following form:

$$L_{cyc}^{T_i} = e^{|T_i(E(x)) - E(R(T_i(E(x))))|_1}$$

The loss function $L_{cyc}^{T_i}$ is used for indicating a loss between an image through the $i^{th}$ transformer network and an image that is transformed, decoded, reconstructed, and re-decoded. When the $i^{th}$ transformer network is more accurate, a value of $L_{cyc}^{T_i}$ is smaller.

504. Repeat the foregoing step 502 and step 503, until a difference between the value of the loss function of each of the networks and an ideal value is less than a preset value.

Optionally, the preset value is a default parameter of the server, or may be a manually set value. In step 502 to step 504, parameters of the $i^{th}$ discriminative network are adjusted first by using the $i^{th}$ image set. After the parameters of the discriminative network are adjusted, values of the loss functions of the decoder network, the reconstruction network, and the $i^{th}$ transformer network are affected, so that parameters of the foregoing networks are adjusted, further a value of a loss function of the $i^{th}$ discriminative network is affected. Therefore, an operation of adjusting parameters in connection is repeated to implement iterative training on a branch of the adversarial network. Operations performed in step 502 to step 504 may be performed on each branch in the adversarial network to train the initialized network, so that a neural network that can perform a plurality of feature transformation is obtained for subsequent image processing.

In some embodiments, weighted summation may further be performed on all of the foregoing loss functions, to obtain a loss function $L_G$ of the adversarial network:

$$L_G(E, T, R) = \sum_{i=1}^{n} L_{adv,i} + \mu_{cls} \sum_{i=1}^{n} L_{cls,i}^{f} + \mu_{cyc} \left( L_{cyc}^{ER} + \sum_{i=1}^{n} L_{cyc}^{T_i} \right)$$

a weight of the third-type loss function of the discriminative network is $\mu_{cls}$, and a weight of a value obtained through adding the loss functions of the decoder network and the plurality of transformer networks is $\mu_{cyc}$. In a possible implementation, when a difference between a value of the loss function $L_G$ of the adversarial network and an ideal value is less than a preset value, training of the adversarial network is regarded to be completed. A weight of each of the loss functions may be a value preset by the server.

505. Obtain, in a case that the image transformation instruction is received, according to at least one piece of transformation requirement information, a plurality of transformer networks corresponding to the at least one piece of transformation requirement information.

506. Input the original image sequentially to the decoder network, the plurality of transformer networks corresponding to the at least one piece of transformation requirement information, and the reconstruction network, and output the target image.

In the foregoing step 505 and step 506, image processing of a plurality of feature transformation performed on the original image is performed by using the trained GAN, to output the target image. An optional implementation process has been described in detail in the previous embodiment, and details are not described herein again.

Through the method provided in the embodiments of this application, a plurality of discriminative networks are trained by constructing the initialized adversarial network and according to a plurality of image sets, then the adversarial network is iteratively trained according to training results of the plurality of discriminative networks. After the adversarial network is trained, and when the image transformation instruction is received, the original image is inputted to the trained adversarial network, and a target image after image processing is outputted. Because the plurality of discriminative networks and the plurality of transformer networks share training data of the decoder network and the reconstruction network, training data required by the GAN for performing a plurality of feature transformation is reduced, and a training time of the GAN is further reduced. Further, by adjusting the value of the loss function of each of the networks, the method can indicate to obtain more accurate parameters of the adversarial network, to implement precise feature transformation. Further, when the image transformation instruction is received, the transformer network corresponding to the transformation requirement information is selected to implement image processing, and a network architecture and resource configurations of the GAN during training and using is optimized.

Any combination of the foregoing optional technical solutions may be used to form an optional embodiment of the present disclosure. Details are not described herein again.

It is to be understood that, the steps in the embodiments of this application are not necessarily performed according to a sequence indicated by step numbers. Unless otherwise explicitly specified in this specification, execution of the steps is not strictly limited, and the steps may be performed in other orders. Moreover, at least some of the steps in the embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

Figure 7:
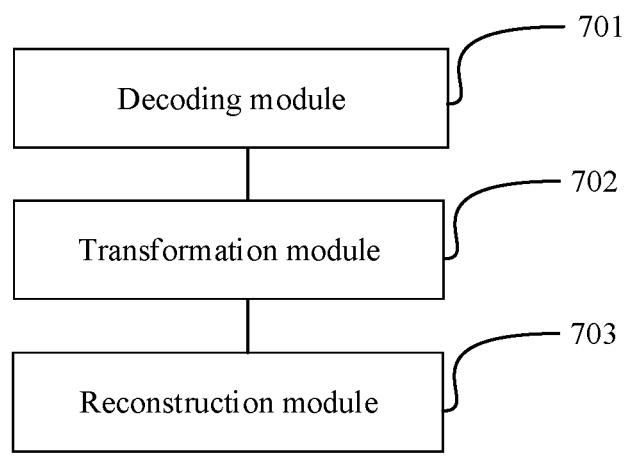
FIG. 7 is a schematic structural diagram of an image processing apparatus according to an embodiment of this application.

FIG. 7 is a schematic structural diagram of an image processing apparatus according to an embodiment of this application. Referring to FIG. 7, the apparatus includes:

a decoding module 701, configured to input an original image to a decoder network according to an image transformation instruction, output a first feature map of the original image, the decoder network being configured to extract features of an image;

a transformation module 702, configured to input the first feature map sequentially to a plurality of transformer networks corresponding to at least one piece of transformation requirement information, and output a second feature map, each of the transformer networks being configured to perform image transformation processing; and a reconstruction module 703, configured to input the second feature map to a reconstruction network, and output a target image, the reconstruction network being configured to reconstruct an inputted feature map into a two-dimensional image.

The apparatus provided by the embodiments of this application inputs, according to an image transformation instruction, an original image sequentially to a decoder network for feature extraction, then inputs the image to a plurality of transformer networks for a plurality of feature transformation, and then inputs the image to a reconstruction network to be reconstructed into a target image. Therefore, when there are more features, the entire process only requires one time of decoding and reconstruction, and making the process of image processing simple and smooth.

In a possible implementation, based on the apparatus composition of FIG. 7, the transformation module 702 includes:

a determining unit, configured to determine, for each of transformer networks and according to transformation requirement information corresponding to the transformer network, a conditional tensor, and the conditional tensor is the same as a width and a height of an inputted feature map corresponding to the transformer network; and a transformation unit, configured to transform, based on the conditional tensor corresponding to the transformer network, a region corresponding to the transformer network in a feature map outputted by a preceding transformer network, and output a feature map of the transformer network.

In a possible implementation, the determining unit is further configured to obtain a conditional vector, the conditional vector being a row vector or a column vector; and expand the conditional vector to be the same as the width and the height of the inputted feature map, to obtain the conditional tensor.

In a possible implementation, based on the apparatus composition of FIG. 7, the transformation unit includes:

a connection subunit, configured to connect the conditional tensor to the inputted feature map in a depth direction, to obtain an expanded tensor;

a dimension-reduction subunit, configured to input the expanded tensor sequentially to a plurality of convolutional layers, until a depth of the expanded tensor is dimensionally reduced to be the same as a depth of the inputted feature map, and output a dimension-reduction tensor;

a first obtaining subunit, configured to obtain a mask according to the dimension-reduction tensor, the mask being configured to indicate a region indicated by the transformation requirement information in the inputted feature map; and a second obtaining subunit, configured to obtain an outputted feature map of the transformer network according to the dimension-reduction tensor, the mask, and the inputted feature map.

In a possible implementation, based on the apparatus composition of FIG. 7, the first obtaining subunit is further configured to input the dimension-reduction tensor to a target convolutional layer of the transformer network, and perform convolution processing on the dimension-reduction tensor; and input the tensor after the convolution processing to an activation function, and output the mask, the activation function being used for performing nonlinear processing on the inputted tensor.

In a possible implementation, based on the apparatus composition of FIG. 7, the second obtaining subunit is further configured to maintain a region corresponding to the mask in the dimension-reduction tensor, and replace regions in the dimension-reduction tensor other than the region corresponding to the mask with corresponding regions in the inputted feature map, to obtain the outputted feature map.

Any combination of the foregoing optional technical solutions may be used to form an optional embodiment of the present disclosure. Details are not described herein again.

Figure 8:
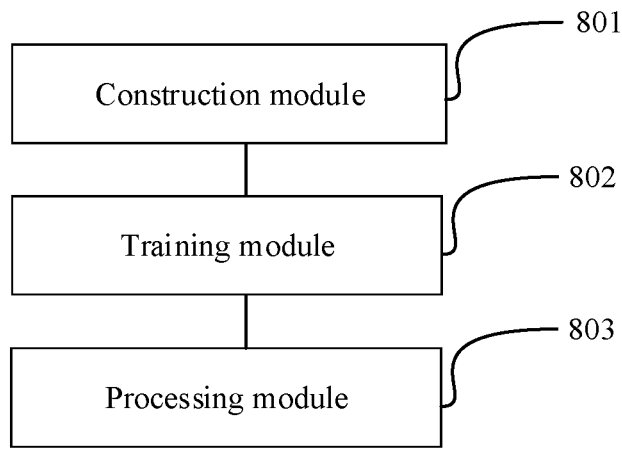
FIG. 8 is a schematic structural diagram of an image processing apparatus according to an embodiment of this application.

FIG. 8 is a schematic structural diagram of an image processing apparatus according to an embodiment of this application. Referring to FIG. 8, the apparatus includes:

a construction module 801, configured to construct an initialized adversarial network, the adversarial network including a decoder network, a plurality of transformer networks, a reconstruction network, and a plurality of discriminative networks;

a training module 802, configured to train the plurality of discriminative networks according to a plurality of image sets, and iteratively train the adversarial network according to training results of the plurality of discriminative networks; and a processing module 803, configured to input an original image to the trained adversarial network in a case that an image transformation instruction is received, and output a target image after image processing.

The apparatus provided in the embodiments of this application trains, by constructing the initialized adversarial network and according to the plurality of image sets, the plurality of discriminative networks; then iteratively trains the adversarial network according to training results of the plurality of discriminative networks; inputs the original image to the trained adversarial network after the adversarial network is trained and when the image transformation instruction is received; and outputs the target image after image processing is performed. Because the plurality of discriminative networks and the plurality of transformer networks share training data of the decoder network and the reconstruction network, training data required by the GAN for performing a plurality of feature transformation is reduced, and a training time of the GAN is further reduced.

In a possible implementation, the processing module 803 is further configured to obtain, in a case that the image transformation instruction is received, according to at least one piece of transformation requirement information, a plurality of transformer networks corresponding to the at least one piece of transformation requirement information; and input the original image sequentially to the decoder network, the plurality of transformer networks corresponding to the at least one piece of transformation requirement information, and the reconstruction network, and output the target image.

In a possible implementation, the training module 802 is further configured to input, for each of the discriminative networks, an image set corresponding to the discriminative network, and adjust parameters of the discriminative network according to a value of a loss function of the discriminative network;

adjust parameters of the decoder network, the reconstruction network, and the transformer network according to the decoder network, the reconstruction network, and a value of a loss function of a transformer network corresponding to the discriminative network; and repeat the operations of adjusting the parameters of the discriminative network, and adjust the parameters of the decoder network, the reconstruction network, and the transformer network, until a difference between the value of the loss function of each of the networks and an ideal value is less than a preset value.

Any combination of the foregoing optional technical solutions may be used to form an optional embodiment of the present disclosure. Details are not described herein again.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the image processing apparatus provided in the foregoing embodiments performs image processing. In practical application, the foregoing functions may be allocated to and completed by different functional modules according to requirements, that is, an inner structure of a device is divided into different functional modules to implement all or a part of the functions described above. In addition, the image processing apparatus provided in the foregoing embodiment has the same idea as the image processing method. For a specific implementation process thereof, reference may be made to the image processing method embodiment, and the details are not described herein again.

Figure 9:
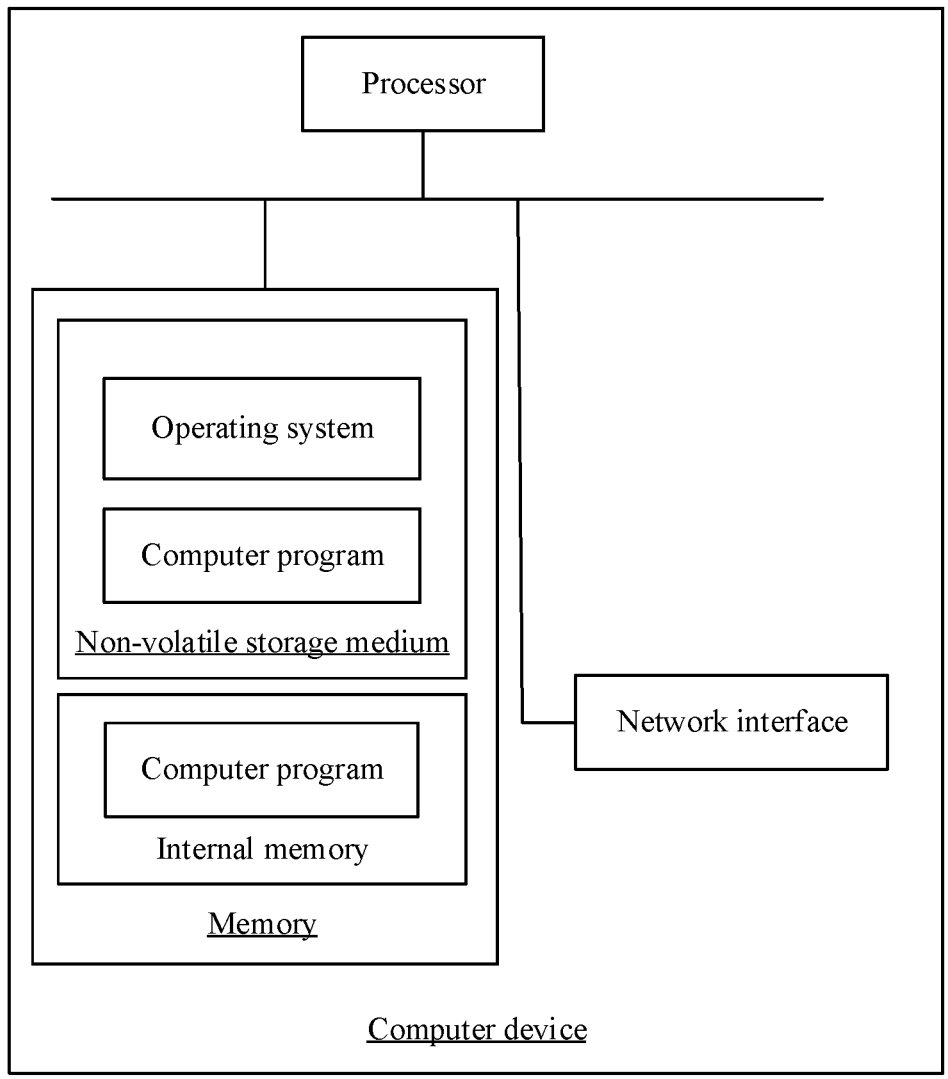
FIG. 9 is a schematic structural diagram of a computer device 102 according to an embodiment of this application.

FIG. 9 is a diagram of an internal structure of a computer device according to an embodiment. As shown in FIG. 9, the computer device includes a processor, a memory, and a network interface that are connected through a system bus. The memory includes a non-volatile storage medium and an internal memory. The non-volatile storage medium of the computer device stores an operating system and may further store a computer program, the computer program, when executed by the processor, may cause the processor to implement the image processing method. The internal memory may also store a computer program, the computer program, when executed by the processor, may cause the processor to perform the image processing method.

In an exemplary embodiment, a computer-readable storage medium, for example, a memory including instructions, is further provided. The instructions may be executed by the processor in the terminal to implement the image processing method in the foregoing embodiment. For example, the computer-readable storage medium may be a (read-only memory) ROM, a (random access memory) (RAM), a (compact disc ROM) CD-ROM, a magnetic tape, a floppy disk, or an optical data storage device.

A person of ordinary skill in the art may understand that all or some of the procedures of the methods in the foregoing embodiments may be implemented by hardware, and by a computer program instructing relevant hardware. The computer program may be stored in a non-volatile computer-readable storage medium. When the computer program is executed, the procedures of the foregoing method embodiments may be performed. References to the memory, the storage, the database, or another medium used in the embodiments provided in this application may all include a non-volatile memory and a volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An image processing method, performed by a computer device, the method comprising:
   inputting an original image to a decoder network according to an image transformation instruction, to obtain a first feature map of the original image, the decoder network being configured to extract features of an image;
   inputting the first feature map sequentially to a plurality of transformer networks, each transformer network corresponding to at least one piece of transformation requirement information associated with the original image, to obtain a second feature map, each of the transformer networks being configured to perform image transformation to a respective region of the first feature map, further including:
      determining, for each of the transformer networks, a conditional tensor according to the piece of transformation requirement information corresponding to the transformer network; and
      transforming, based on the conditional tensor corresponding to the transformer network, a region corresponding to the transformer network in a respective feature map outputted by a preceding transformer network, and outputting the respective feature map of the transformer network; and
   inputting the second feature map to a reconstruction network, to obtain a target image, the reconstruction network being configured to reconstruct an inputted feature map into a two-dimensional image.

2. The method according to claim 1, wherein the determining, for each of the transformer networks, a conditional tensor according to the piece of transformation requirement information corresponding to the transformer network comprises:
   obtaining a conditional vector; and
   expanding the conditional vector to have the same width and height of an inputted feature map corresponding to the transformer network, to obtain the conditional tensor.

3. The method according to claim 1, wherein the transforming, based on the conditional tensor corresponding to the transformer network, a region corresponding to the transformer network in a feature map outputted by a preceding transformer network, and outputting the feature map of the transformer network comprises:
   connecting the conditional tensor to the inputted feature map in a depth direction, to obtain an expanded tensor;
   inputting the expanded tensor sequentially to a plurality of convolutional layers, until a depth of the expanded tensor is dimensionally reduced to be the same as a depth of the inputted feature map, and outputting a dimension-reduction tensor;
   obtaining a mask according to the dimension-reduction tensor, the mask being configured to indicate a region indicated by the transformation requirement information in the inputted feature map; and obtaining an outputted feature map of the transformer network according to the dimension-reduction tensor, the mask, and the inputted feature map.

4. The method according to claim 3, wherein the obtaining a mask according to the dimension-reduction tensor comprises:
   inputting the dimension-reduction tensor to a target convolutional layer of the transformer network, and performing convolution processing on the dimension-reduction tensor; and
   inputting the tensor after the convolution processing to an activation function, and outputting the mask, the activation function being used for performing nonlinear processing on the inputted tensor.

5. The method according to claim 3, wherein the obtaining an outputted feature map of the transformer network according to the dimension-reduction tensor, the mask, and the inputted feature map comprises:
   maintaining a region corresponding to the mask in the dimension-reduction tensor, and replacing regions in the dimension-reduction tensor other than the region corresponding to the mask with corresponding regions in the inputted feature map, to obtain the outputted feature map.

6. A computer device, comprising a memory and a processor, the memory storing computer-readable instructions, the computer-readable instructions, when executed by the processor, causing the computer device to perform a plurality of operations including:
   inputting an original image to a decoder network according to an image transformation instruction, to obtain a first feature map of the original image, the decoder network being configured to extract features of an image;
   inputting the first feature map sequentially to a plurality of transformer networks, each transformer network corresponding to at least one piece of transformation requirement information associated with the original image, to obtain a second feature map, each of the transformer networks being configured to perform image transformation to a respective region of the first feature map, further including:
      determining, for each of the transformer networks, a conditional tensor according to the piece of transformation requirement information corresponding to the transformer network; and
      transforming, based on the conditional tensor corresponding to the transformer network, a region corresponding to the transformer network in a respective feature map outputted by a preceding transformer network, and outputting the respective feature map of the transformer network; and
   inputting the second feature map to a reconstruction network, to obtain a target image, the reconstruction network being configured to reconstruct an inputted feature map into a two-dimensional image.

7. The computer device according to claim 6, wherein the determining, for each of the transformer networks, a conditional tensor according to the piece of transformation requirement information corresponding to the transformer network comprises:
   obtaining a conditional vector; and
   expanding the conditional vector to have the same width and height of an inputted feature map corresponding to the transformer network, to obtain the conditional tensor.

8. The computer device according to claim 6, wherein the transforming, based on the conditional tensor corresponding to the transformer network, a region corresponding to the transformer network in a feature map outputted by a preceding transformer network, and outputting the feature map of the transformer network comprises:
   connecting the conditional tensor to the inputted feature map in a depth direction, to obtain an expanded tensor;
   inputting the expanded tensor sequentially to a plurality of convolutional layers, until a depth of the expanded tensor is dimensionally reduced to be the same as a depth of the inputted feature map, and outputting a dimension-reduction tensor;
   obtaining a mask according to the dimension-reduction tensor, the mask being configured to indicate a region indicated by the transformation requirement information in the inputted feature map; and
   obtaining an outputted feature map of the transformer network according to the dimension-reduction tensor, the mask, and the inputted feature map.

9. The computer device according to claim 8, wherein the obtaining a mask according to the dimension-reduction tensor comprises:
   inputting the dimension-reduction tensor to a target convolutional layer of the transformer network, and performing convolution processing on the dimension-reduction tensor; and
   inputting the tensor after the convolution processing to an activation function, and outputting the mask, the activation function being used for performing nonlinear processing on the inputted tensor.

10. The computer device according to claim 8, wherein the obtaining an outputted feature map of the transformer network according to the dimension-reduction tensor, the mask, and the inputted feature map comprises:
    maintaining a region corresponding to the mask in the dimension-reduction tensor, and replacing regions in the dimension-reduction tensor other than the region corresponding to the mask with corresponding regions in the inputted feature map, to obtain the outputted feature map.

11. One or more non-transitory computer readable storage mediums storing computer-readable instructions, the computer-readable instructions, when executed by one or more processors of a computer device, causing the computer device to perform a plurality of operations including:
    inputting an original image to a decoder network according to an image transformation instruction, to obtain a first feature map of the original image, the decoder network being configured to extract features of an image;
    inputting the first feature map sequentially to a plurality of transformer networks, each transformer network corresponding to at least one piece of transformation requirement information associated with the original image, to obtain a second feature map, each of the transformer networks being configured to perform image transformation to a respective region of the first feature map, further including:
       determining, for each of the transformer networks, a conditional tensor according to the piece of transformation requirement information corresponding to the transformer network; and
       transforming, based on the conditional tensor corresponding to the transformer network, a region corresponding to the transformer network in a respective feature map outputted by a preceding transformer network, and outputting the respective feature map of the transformer network; and inputting the second feature map to a reconstruction network, to obtain a target image, the reconstruction network being configured to reconstruct an inputted feature map into a two-dimensional image.

12. The non-transitory computer readable storage mediums according to claim 11, wherein the determining, for each of the transformer networks, a conditional tensor according to the piece of transformation requirement information corresponding to the transformer network comprises:

obtaining a conditional vector; and expanding the conditional vector to have the same width and height of an inputted feature map corresponding to the transformer network, to obtain the conditional tensor.

13. The non-transitory computer readable storage mediums according to claim 11, wherein the transforming, based on the conditional tensor corresponding to the transformer network, a region corresponding to the transformer network in a feature map outputted by a preceding transformer network, and outputting the feature map of the transformer network comprises:

connecting the conditional tensor to the inputted feature map in a depth direction, to obtain an expanded tensor;

inputting the expanded tensor sequentially to a plurality of convolutional layers, until a depth of the expanded tensor is dimensionally reduced to be the same as a depth of the inputted feature map, and outputting a dimension-reduction tensor;

obtaining a mask according to the dimension-reduction tensor, the mask being configured to indicate a region indicated by the transformation requirement information in the inputted feature map; and obtaining an outputted feature map of the transformer network according to the dimension-reduction tensor, the mask, and the inputted feature map.

14. The non-transitory computer readable storage mediums according to claim 13, wherein the obtaining a mask according to the dimension-reduction tensor comprises:

inputting the dimension-reduction tensor to a target convolutional layer of the transformer network, and performing convolution processing on the dimension-reduction tensor; and inputting the tensor after the convolution processing to an activation function, and outputting the mask, the activation function being used for performing nonlinear processing on the inputted tensor.

15. The non-transitory computer readable storage mediums according to claim 13, wherein the obtaining an outputted feature map of the transformer network according to the dimension-reduction tensor, the mask, and the inputted feature map comprises:

maintaining a region corresponding to the mask in the dimension-reduction tensor, and replacing regions in the dimension-reduction tensor other than the region corresponding to the mask with corresponding regions in the inputted feature map, to obtain the outputted feature map.

* * * * *